United States Patent
Archie et al.

(10) Patent No.: US 7,353,128 B2
(45) Date of Patent: Apr. 1, 2008

(54) MEASUREMENT SYSTEM OPTIMIZATION

(75) Inventors: Charles N. Archie, Granite Springs, NY (US); George W. Banke, Jr., Essex Junction, VT (US); Eric P. Solecky, Hyde Park, NY (US)

(73) Assignee: International Business Machines Corporation, Armnok, NY (US)

( * ) Notice: Subject to any disclaimer, the term of this patent is extended or adjusted under 35 U.S.C. 154(b) by 0 days.

(21) Appl. No.: 11/307,641

(22) Filed: Feb. 15, 2006

(65) Prior Publication Data

US 2007/0192049 A1  Aug. 16, 2007

(51) Int. Cl.
G06F 19/00 (2006.01)
G01B 11/14 (2006.01)

(52) U.S. Cl. .................................. 702/85; 356/625
(58) Field of Classification Search .............. 702/85, 702/108, 155; 356/625, 629; 700/121, 108; 438/5, 14
See application file for complete search history.

(56) References Cited

U.S. PATENT DOCUMENTS

| | | | | |
|---|---|---|---|---|
| 5,546,312 A * | 8/1996 | Mozumder et al. | ........... | 700/97 |
| 5,835,227 A * | 11/1998 | Grodnensky et al. | ....... | 356/399 |
| 6,055,045 A * | 4/2000 | Weill et al. | ............... | 356/124 |
| 6,432,760 B1 | 8/2002 | Kothandaraman et al. | .. | 438/215 |
| 6,937,914 B1 * | 8/2005 | Bode et al. | ................. | 700/121 |
| 7,065,423 B2 * | 6/2006 | Prager et al. | .............. | 700/108 |
| 7,092,110 B2 * | 8/2006 | Balasubramanian et al. | ................. | 356/625 |
| 7,171,284 B2 * | 1/2007 | Vuong et al. | ............... | 700/121 |

FOREIGN PATENT DOCUMENTS

| WO | WO2004059247 | 7/2004 |
|---|---|---|
| WO | WO 2004059247 A1 * | 7/2004 |

OTHER PUBLICATIONS

Imai et al., Development of Equipment-Installed APC System and Critical Dimension Control Technology of Gate-Hard-Mask Etching Using Its System, 2005 IEEE, pp. 139-142.*
Banke et al., Characteristics of Accuracy for CD Metrology, Mar. 1999, SPIE vol. 3677, pp. 291-308.*
W. Banke and C. Archie, "Characteristics of accuracy for CD metrology," Metrology, Inspection and Process Control for Microlithography XIII, B. Singh, Editor, Proceedings of SPIE, vol. 3677, pp. 291-309:, 1999.

* cited by examiner

Primary Examiner—John Barlow
Assistant Examiner—Toan M. Le
(74) Attorney, Agent, or Firm—Lisa U. Jaklitsch; Hoffman, Warnick & D'Alessandro LLC (57) ABSTRACT

Optimizing a measurement system under test (MSUT) is disclosed. In one embodiment, a method includes selecting a first set of adjustable parameters of the MSUT that affect a quality metric for the MSUT, calculating the quality metric over a range of values of each adjustable parameter in the first set of adjustable parameters, generating a first multidimensional response space based on the calculating step, and determining which value of each adjustable parameter optimizes the quality metric based on the first multidimensional response space. The multidimensional response space may be stored for later recall for other optimization exercises.

27 Claims, 6 Drawing Sheets

MEASUREMENT SYSTEM OPTIMIZATION

BACKGROUND OF THE INVENTION

1. Technical Field

The invention relates generally to measurement systems, and more particularly, to methods, system and program product for optimizing a measurement system under test (MSUT).

2. Background Art

Measurement systems (i.e., metrology tool(s)) are used to measure many structures during various process steps in the semiconductor fabrication industry. The measurements may include, for example, gate critical dimensions on a critical dimension scanning electron microscope (CD-SEM) or scatterometry tool, gate dielectric thickness on thin film measuring tools, the overlay between gate level and first level print and via measurement in the back end of line (BEOL). The measurements are used to control processing at levels based on the International Technology Roadmap for Semiconductors (ITRS).

One challenge for obtaining quality measurements is managing the hundred or more decisions being made as measurement recipes for measuring a process step are constructed, each of which may lead to a difference in measurement. In particular, each person operating a measurement system may use different values for adjustable parameters of a measurement system that determine how well the measurement system will measure a given target, e.g., wafer and process step, being measured. Determining which values of adjustable parameters results in an optimized measurement, e.g., best precision, best accuracy, best matching, etc., is very difficult to accomplish.

Conventionally, the optimization process is performed using the simplest metric, precision. Unfortunately, using only the precision can lead to missing key issues in the optimization selection process. For example, if a smoothing filter on a CD-SEM algorithm at gate etch critical dimension measurement is changed and the response to precision is observed, one would find that generally the higher the smoothing the better the precision thereby suggesting that higher smoothing equates to better quality measurements. But, if one used a different quality metric, for example, accuracy, then one would come to a different conclusion. It turns out that there exists a balancing point between precision and accuracy, the higher smoothing filter sizes end up smoothing too much at the expense of accuracy in the measurement. The above-described problem is magnified because the measurement of each of the hundreds of the monitored process steps in a manufacturing setting requires its own custom optimization.

If optimized correctly, the resulting measurements provide better process control discrimination, and better correlation to electrical test parameters. Unfortunately, for many process steps, a measurement system error (e.g., precision, matching and/or accuracy) is high with respect to the tolerances at which the process step must be controlled. This is traditionally referred to as a precision to tolerance (P/T) ratio. In this case, a measurement system error as determined based on a quality metric should consume no more than, for example, 20% of the tolerance. A quality metric may include measures such as single tool precision, fleet matching precision (FMP), total measurement uncertainty (TMU) (also referred to as accuracy) or a combination thereof. The closer the P/T ratio is to unity, the less likely it is that the process can be controlled to the required tolerances because the measurement uncertainty is too high, making it difficult to de-couple process variation from measurement error. Accordingly, a solution to optimize a measurement system is needed.

SUMMARY OF THE INVENTION

Optimizing a measurement system under test (MSUT) is disclosed. In one embodiment, a method includes selecting a first set of adjustable parameters of the MSUT that affect a quality metric for the MSUT, calculating the quality metric over a range of values of each adjustable parameter in the first set of adjustable parameters, generating a first multidimensional response space based on the calculating step, and determining which value of each adjustable parameter optimizes the quality metric based on the first multidimensional response space. The multidimensional response space may be stored for later recall for other optimization exercises.

A first aspect of the invention provides a method of optimizing a measurement system under test (MSUT), the method comprising the steps of: selecting a first set of adjustable parameters of the MSUT that affect a quality metric for the MSUT; calculating the quality metric over a range of values of each adjustable parameter in the first set of adjustable parameters; generating a first multidimensional response space based on the calculating step; and determining which value of each adjustable parameter optimizes the quality metric based on the first multidimensional response space.

A second aspect of the invention provides a system for optimizing a measurement system under test (MSUT), the system comprising: a calculator for calculating a quality metric for the MSUT over a range of values of each adjustable parameter in a first set of adjustable parameters that affect the quality metric; a generator for generating a first multidimensional response space based on the calculating step; and a determinator for determining which value of each adjustable parameter optimizes the quality metric based on the first multidimensional response space.

A third aspect of the invention provides a program product stored on a computer-readable medium, which when executed, optimizes a measurement system under test (MSUT), the program product comprising: program code for calculating a quality metric for the MSUT over a range of values of each adjustable parameter in a first set of adjustable parameters that affect the quality metric; program code for generating a first multidimensional response space based on the calculating step; and program code for determining which value of each adjustable parameter optimizes the quality metric based on the first multidimensional response space.

A fourth aspect of the invention provides a method of optimizing a measurement system under test (MSUT), the method comprising the steps of: selecting a first set of adjustable parameters of the MSUT that affect a quality metric for the MSUT; measuring a set of process stressed artifacts over the range of values of each adjustable parameter in the first set of adjustable parameters; calculating the quality metric for each measurement; generating a first multidimensional response space based on the calculating step; recalling a second multidimensional response space that is based on a second set of adjustable parameters; and determining which value of each adjustable parameter in the first multidimensional response space and the second multidimensional response space optimizes the quality metric.

A fifth aspect of the invention provides a computer-readable medium that includes computer program code to enable a computer infrastructure to optimize a measurement system under test (MSUT), the computer-readable medium comprising computer program code for performing the method steps of the invention.

An sixth aspect of the invention provides a business method for optimizing a measurement system under test (MSUT), the business method comprising managing a computer infrastructure that performs each of the steps of the invention; and receiving payment based on the managing step.

A seventh aspect of the invention provides a method of generating a system for optimizing a measurement system under test (MSUT), the method comprising: obtaining a computer infrastructure; and deploying means for performing each of the steps of the invention to the computer infrastructure.

The illustrative aspects of the present invention are designed to solve the problems herein described and/or other problems not discussed.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

The description includes the following headings for clarity purposes only: I. Definitions, II. Computer Infrastructure Overview, III. Operational Methodology, and IV. Conclusion.

I. Definitions

A "measurement system" or "measurement system under test" (hereinafter "MSUT") can be any measurement tool such as a critical dimension scanning electron microscope (CD-SEM), an atomic force microscope (AFM), a scatterometer, an overlay measuring tool, a thin film measuring tool, etc., or a combination of such (i.e., a fleet). Accordingly, it should be recognized that while particular types of measurement systems may be mentioned in the description, the teachings of the invention are applicable to any type of measurement system. In addition, while the invention will be described in the setting of the semiconductor industry, and in particular to critical dimension measurement systems, it should be recognized that the teachings of the invention are applicable to any industry or measurement system where measurement uncertainty is present and more than one tool is used to control a manufacturing setting, e.g., a manufacturing line.

A "fleet" is a grouping of at least two systems measuring the same applications and may include a variety of measurement systems.

"Artifacts" are a plurality of structures to be measured provided on a substrate that represent variations in a particular semiconductor process of interest for the particular MSUT. Artifacts are configured to represent different semiconductor wafers at critical process steps that challenge the capabilities of an MSUT on structures and materials likely to be encountered by the particular MSUT. Artifacts may include "process-stressed artifacts" (PSA), which are constructed or pulled from the manufacturing line to represent key process steps and process variations the measurement tool will encounter.

"Adjustable parameter" is any alterable feature of a measurement system that controls operation, a calculation and/or output of the measurement system, and affects a quality metric. For example, for a CD-SEM, adjustable parameters may include at least one tool operation adjustable parameter such as an accelerating voltage, beam current, scan strategies, exposure time, etc., and/or at least one analysis adjustable parameter such as an algorithm filter, edge detection algorithm, averaging, smoothing filters, edge detection threshold, etc. Each measurement system and each type of measurement system may include its own group of adjustable parameters. Adjustable parameters may be grouped into a user-definable "set of adjustable parameters."

A "measurement recipe" includes a coded set of instructions to control the system, which defines where to measure and what to measure. A measurement recipe may include a set of adjustable parameter values used to operate the MSUT.

"Measureand" is the object or feature to be measured.

"Fleet measurement precision (FMP)" is a metric that provides an indication of the fleet's overall measurement precision. FMP is more fully described in co-pending and co-owned U.S. patent application Ser. Nos. 11/065740 and 11/245865, which are hereby incorporated herein by reference.

"Tool matching precision (TMP)" is a metric that provides an indication of a tool's overall measurement precision and matching compared to a benchmark measurement system. TMP is more fully described in co-pending and co-owned U.S. patent application Ser. Nos. 11/065740 and 11/245865, which are hereby incorporated herein by reference.

"Total measurement uncertainty (TMU)" is a metrology metric that combines single tool precision and accuracy. The TMU is calculated based on a linear regression analysis and removing a reference measuring system uncertainty ($U_{RMS}$) from a net residual error. TMU is more fully described in co-pending and co-owned U.S. patent application Ser. Nos. 10/524286 and 11/062668, which are hereby incorporated herein by reference.

"Offset" is the difference between the average of the measurement values of the MSUT and the average of the measurement values from a reference metrology system (RMS).

"Slope" is an abbreviated term for Mandel slope, but this methodology is not limited to Mandel regression analysis. "Mandel slope" is the slope ($\beta$) of the best-fit line resulting from the Mandel regression analysis, which determines this when both the MSUT and the RMS exhibit uncertainties.

"Slope-induced shift offset" (hereinafter "SISoffset") indicates the non-unity slope penalty further away from the process window center between a MSUT measurement of an artifact and a reference measurement of the artifact by a reference measurement system (RMS).

$$SISoffset = v(Process\ Window)(1-\beta), \text{ where the}$$

"Process Window" is defined as the allowed variation over time for the given process. The fraction v depends upon the nature of the manufacturing process sampling of the process window over time.

The above-defined FMP, TMP, TMU, offset, slope and slope-induced shift offset are described more fully in PCT Publication No. WO/2004/059247, and co-pending and co-owned US patent application Ser. Nos. 10/524286 and 11/062668, which are hereby incorporated herein by reference.

A "quality metric" is any value indicating an ability of a measurement system to work correctly. Examples will be described below.

II. Computer Infrastructure Overview

Figure 1:
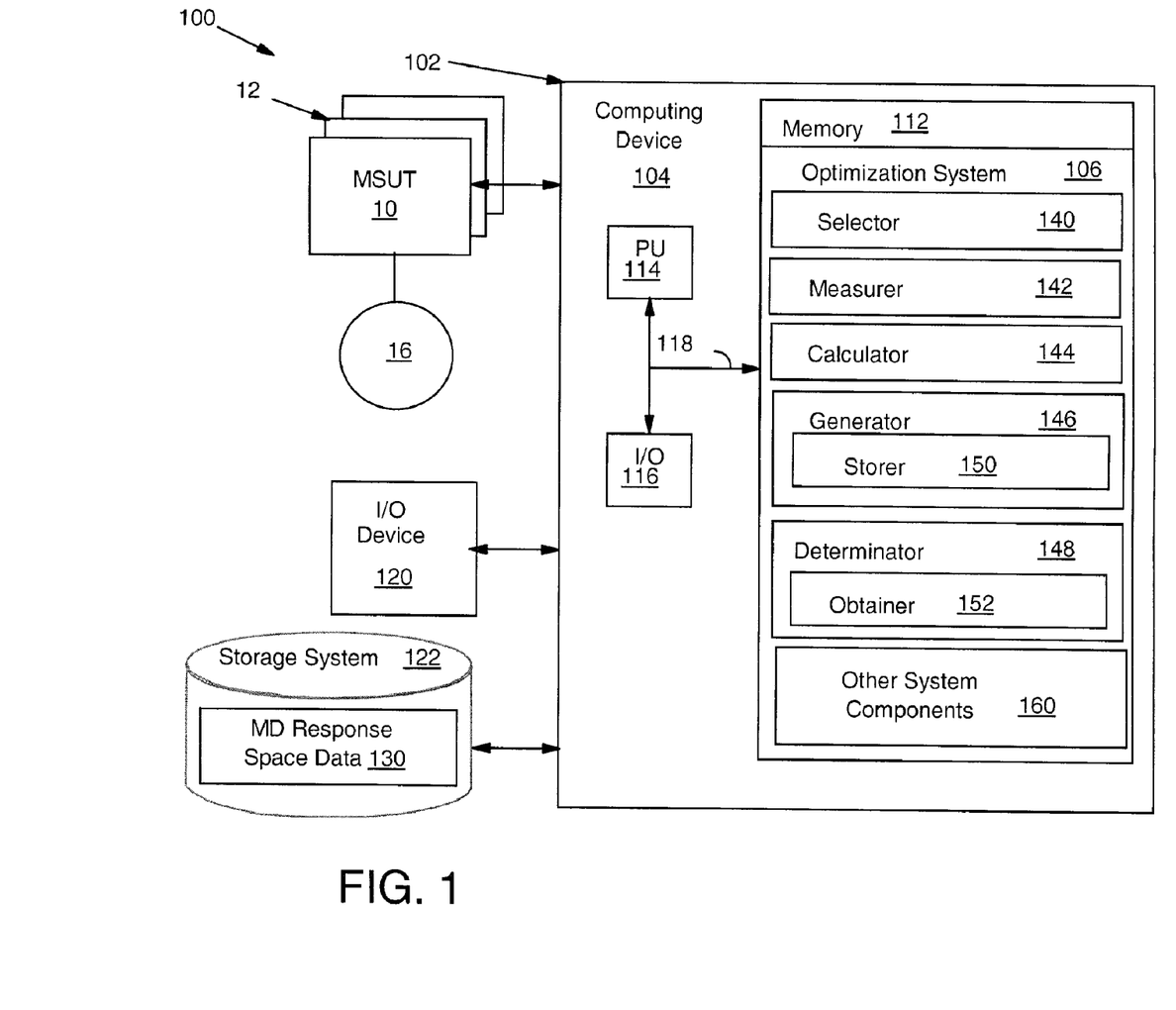
FIG. 1 shows a block diagram of an optimization system and environment according to one embodiment of the invention.

Turning to the drawings, FIG. 1 shows an illustrative environment 100 for optimizing a measurement system under test (MSUT) 10 including an optimization system 106. MSUT 10 may be part of a fleet 12 of measurement systems. Although illustrated as a stand-alone system, optimization system 106 may be incorporated in any now known or later developed measurement system control and/or testing system. Environment 100 includes a computer infrastructure 102 that can perform the various process steps described herein for optimizing MSUT 10. In particular, computer infrastructure 102 is shown including a computing device 104 that comprises an optimization system 106, which enables computing device 104 to optimize MSUT 10 by performing the process steps of the invention.

Computing device 104 is shown including a memory 112, a processor (PU) 114, an input/output (I/O) interface 116, and a bus 118. Further, computing device 104 is shown in communication with an external I/O device/resource 120 and a storage system 122. As is known in the art, in general, PU 114 executes computer program code, such as optimization system 106, that is stored in memory 112 and/or storage system 122. While executing computer program code, PU 114 can read and/or write data, such as multidimensional (MD) response space data 130, to/from memory 112, storage system 122, and/or I/O interface 116. Bus 118 provides a communications link between each of the components in computing device 104. I/O device 120 can comprise any device that enables a user to interact with computing device 104 or any device that enables computing device 104 to communicate with one or more other computing devices.

In any event, computing device 104 can comprise any general purpose computing article of manufacture capable of executing computer program code installed thereon (e.g., a personal computer, server, handheld device, etc.). However, it is understood that computing device 104 and optimization system 106 are only representative of various possible equivalent computing devices that may perform the various process steps of the invention. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the invention. For example, in one embodiment, computer infrastructure 102 comprises two or more computing devices (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computing devices may utilize any combination of various types of transmission techniques.

As previously mentioned and discussed further below, optimization system 106 enables computing infrastructure 102 to optimize MSUT 10. To this extent, optimization system 106 is shown including: a selector 140, a measurer 142, a calculator 144, a generator 146 including a storer 150, a determinator 148 including an obtainer 152, and any other system components 160 required for operation of system 106 not expressly described herein. Operation of each of these components is discussed further below. However, it is understood that some of the various components shown in FIG. 1 can be implemented independently, combined, and/or stored in memory for one or more separate computing devices that are included in computer infrastructure 102. Further, it is understood that some of the systems and/or functionality may not be implemented, or additional systems and/or functionality may be included as part of environment 100.

III. Operational Methodology

Figure 2:
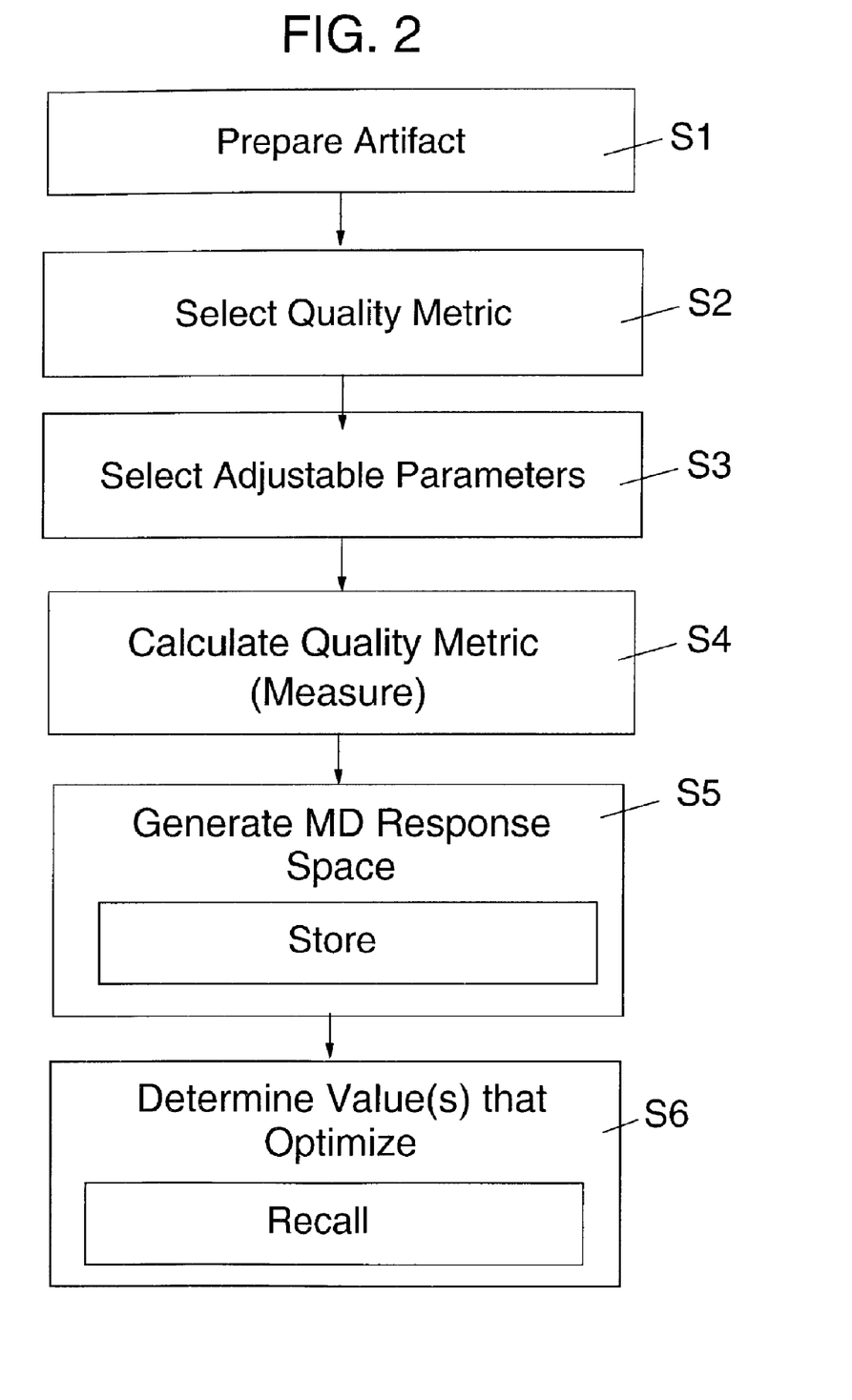
FIG. 2 shows a flow diagram of one embodiment of an operational methodology according to the invention.
Figure 4A:
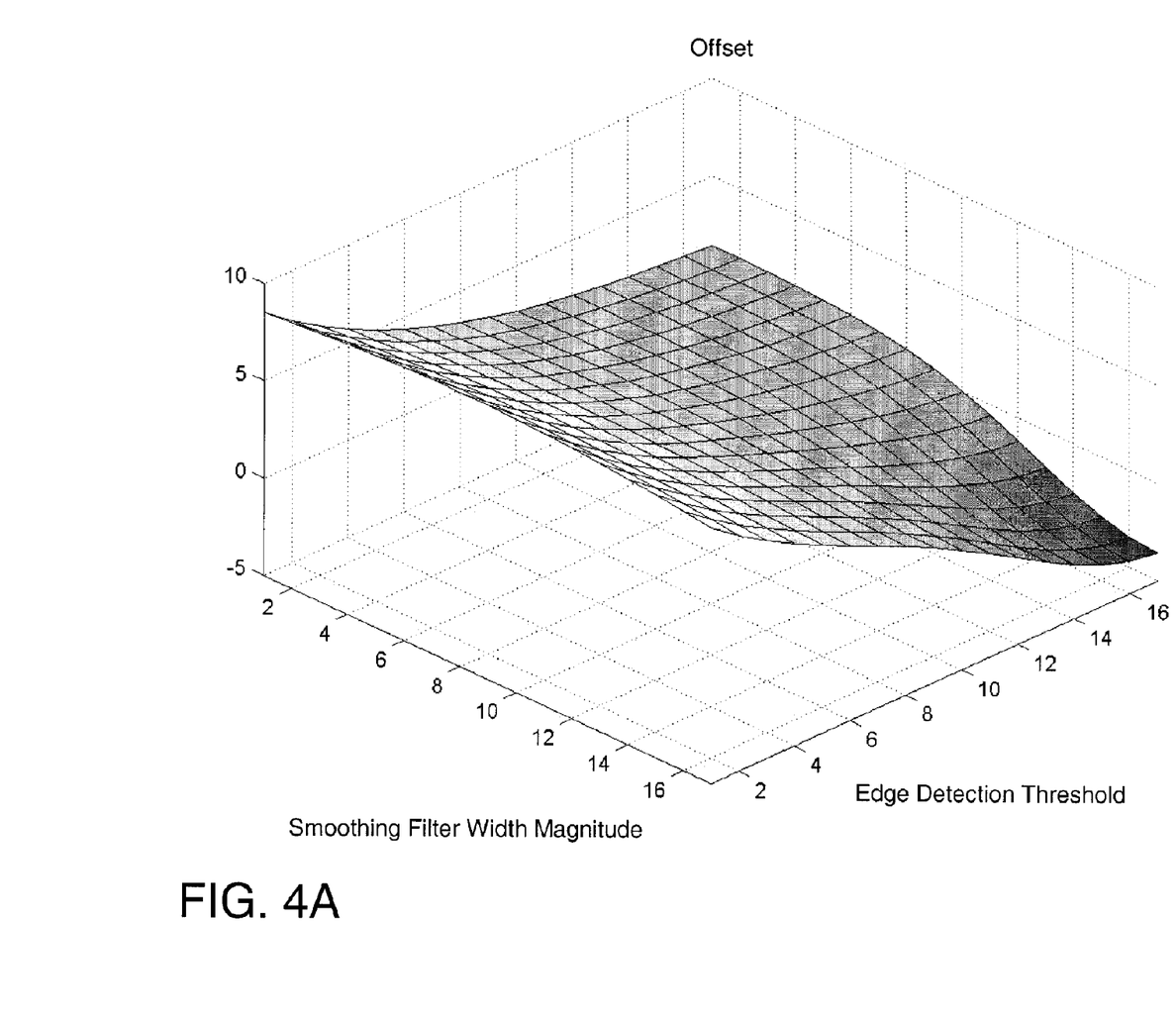
FIGS. 4A-C show illustrative multidimensional response spaces according to one embodiment of the invention.
Figure 4B:
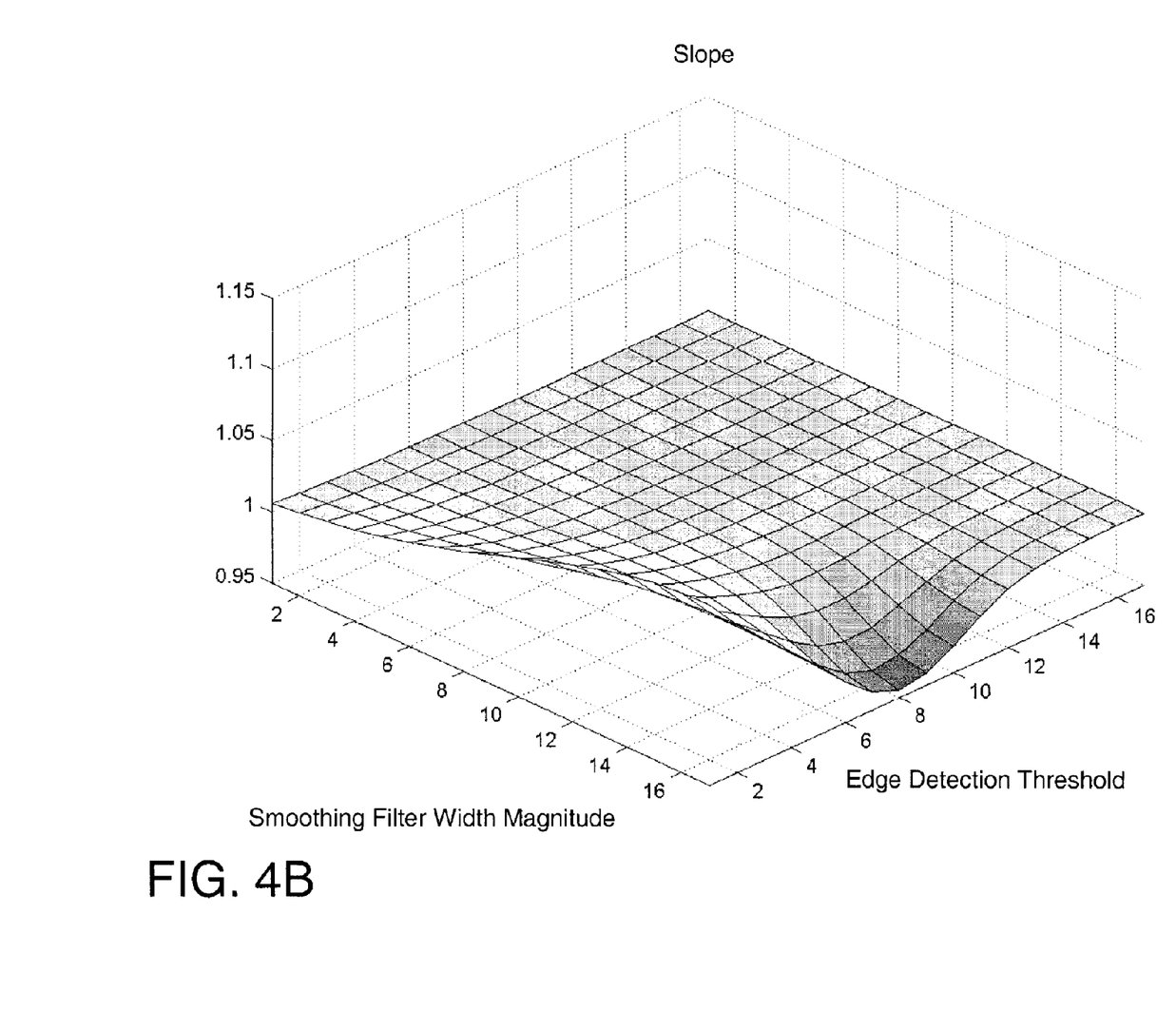
Figure 4C:
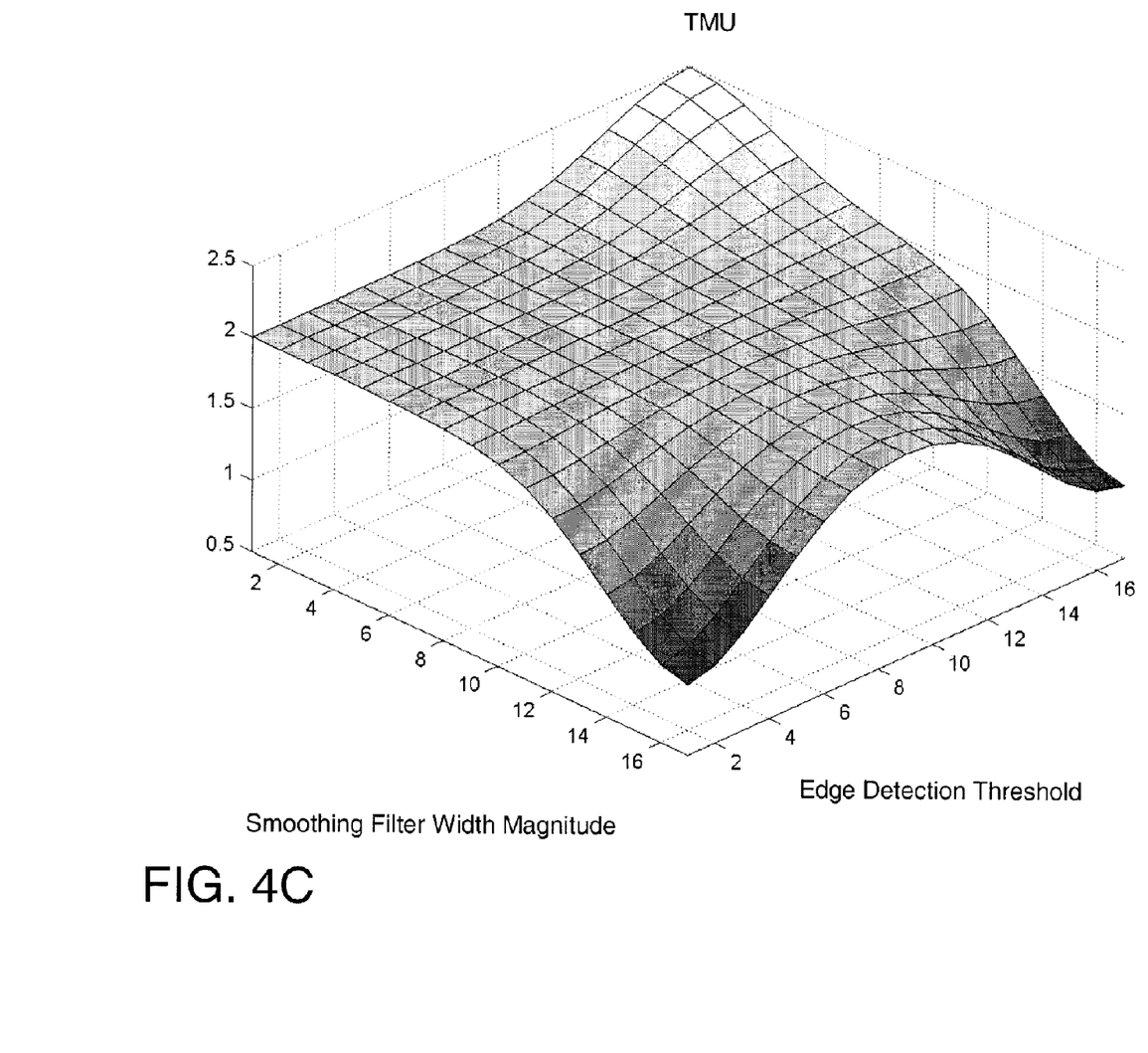

Referring to FIG. 2 along with the other figures, one embodiment of an operational methodology will now be described. For purposes of clarity, the following description will reference one example in which the goal is optimization of a critical dimension (CD) measurement quality for a transistor gate forming lithography process in a semiconductor fabrication setting. For this example, a CD-SEM is used. Results for this example are shown in FIGS. 4A-C. Hereafter, the example shall be referenced as the "CD-SEM example." It is understood, however, that the teachings of the invention are not limited to any particular setting e.g., any particular monitored process step, MSUT, adjustable parameter, quality metric, etc. In addition, it is understood that the operational methodology described below may be performed for each process step being monitored.

Figure 3:
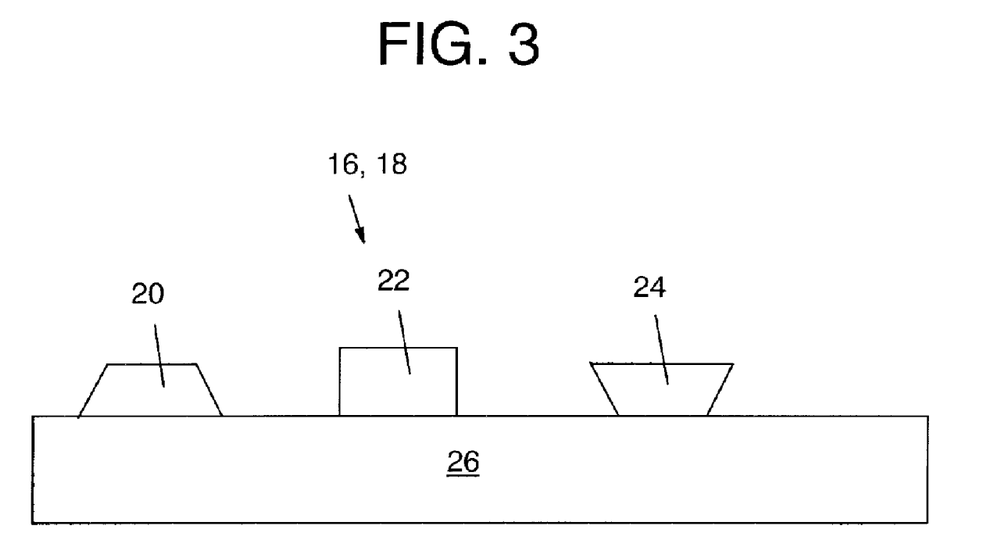
FIG. 3 shows illustrative artifacts for use with the optimization system of FIG. 1.

In a first preliminary step S1, artifacts 16 for use in assessing one or more MSUT 10 and/or fleet 12 are prepared. With reference to FIG. 3, artifacts 16 include a plurality of structures 18 provided on a substrate 26. Some structures 18 for a particular process may include, for example: an under-exposed structure 20, an ideal structure 22, and an overexposed undercut structure 24. The types of artifacts 16 provided may vary drastically based on, for example, the type of measurement needing assessment, the manufacturing process steps that alter the measurement, and measurement parameters that alter the measurement such as temperature, probe damage, manufactured product structure or materials, etc.

In one embodiment, artifacts 16 include processed stressed artifacts (PSA) and/or a comprehensive set of PSAs. In any event, artifacts 16 reflect important manufacturing process variables. For example, consider a wafer from the semiconductor fabrication process sampled prior to photo-lithographic exposure defining the transistor gate. Instead of exposing this artifact 16 at fixed dose and focus, one would instead expose it with multiple photolithographic scanner focuses and exposures in a matrix (FEM). This FEM is used because the process and metrology engineers recognize that dose and focus will change over time and these process variables will have an impact on the shape of the measured feature(s). These process variables are not limited to the lithography process, as they can be varied for any such process the toolset is responsible for measuring and controlling. These process variables are then duplicated on artifacts 16 across realistic process ranges as would be encountered in the manufacturing line over an extended period of time.

These selected process steps for artifacts 16 creation are known to yield realistic measurement structures with all variations that may be encountered in the production line. In the case of the CD-SEM example, these measurement systems are generally required to measure a variety of different structure types. Some basic structure types include lines, spaces, contacts and islands among other more complicated structures like line ends and corners. Another example of challenging measurement structures is nested and isolated lines in any orientation, which are typical of structures encountered in assessing across-chip-linewidth-variation. This is an example where artifacts 16 have multiple structures measured to insure fleet 12 does not have any issues with this variety of structures for this process step and to insure each structure is measured optimally. Since measuring each process and structure type may have its own unforeseen issues and/or requirements, a comprehensive set of PSAs that stresses all these key process and structure types will indicate how the process step will perform in the manufacturing line with respect to measurement quality.

Each structure on an artifact 16 requires its own measurement and each structure may have unique issues in obtaining a quality measurement depending on the MSUT 10 type that might measure it. For example, a CD-SEM may easily generate a measurement for both a nested and isolated line but it may bias one of these measurements with respect to the other because of signal collection differences between the isolated line versus the nested line. Not only will each process step require its own measurement optimization, each structure being measured for a given process may also need its own optimization. The CD-SEM example focuses on an optimization of one particular structure, a semi-nested line, being measured for a gate lithography process.

In a second step S2, a quality metric to evaluate is selected, e.g., using a selector 140. The quality metric used may depend on various criteria. In one embodiment, selector 140 may automatically select a quality metric, e.g., based on which quality metric historically is the most significant for a particular type of MSUT 10. In the CD-SEM example, one of the quality metrics chosen may be TMU because, here, the CD-SEM is compared against a reference measurement system (RMS), e.g., a CD atomic force microscope (CD-AFM). In another embodiment, selector 140 may provide an interface for a user to select a quality metric. The quality metric may include, for example, precision, TMP, FMP, TMU, offset, SISoffset, a slope, a combination of the aforementioned, or any other now known or later developed quality metric.

In one embodiment, the quality metric includes only one of the afore-mentioned values. For example, precision may be used where a reference measurement system (RMS) is not available (or not used) and a single tool MSUT 10 is being used in fleet 12 for the process step being optimized. In this most simple case, only precision is used for the optimization. In another example, FMP may be used where a RMS is not available (or not used) and more than one measurement system is being optimized. In another example, TMU may be used when a RMS is available and used and a single measurement system is being optimized.

In another embodiment, the quality metric may include a combination of a plurality of quality metrics. In this embodiment, the quality metric may include assigning at least one of the plurality of quality metrics a different weighting than the other quality metric(s). In another example, in one embodiment, a quality metric may include accuracy metrics of TMU, offset, and slope. For example, if MSUT 10 output is required to minimize any differences due to feature geometry and material, then the following may be a useful quality metric:

$$\text{Quality Metric} = \sqrt{TMU^2 + \textit{offset}^2 + \textit{SISoffset}^2}.$$

A more general formulation is the following where the user could choose relative weightings $c_1$, $c_2$ and $c_3$:

$$\text{Quality Metric} = \sqrt{c_1 TMU^2 + c_2 \textit{offset}^2 + c_3 \textit{SISoffset}^2}.$$

In another embodiment, the matching metric of FMP, the single tool precision and the accuracy metrics of TMU, offset, and SISoffset can be combined to form a new quality metric:

$$\text{Quality Metric} = \sqrt{c_4 TMU^2 + c_5 FMP^2 + c_6 \textit{offset}^2 + c_7 \textit{SISoffset}^2 + c_8 \textit{precision}^2}.$$

Note: in order to avoid double counting the precision which is embedded in both the TMU and FMP metrics, one can use $c_8$ to remove one instance of precision. Often $c_1$, $c_4$ and $c_5$ would be set equal to unity.

In step S3, a first set of adjustable parameters of MSUT 10 that affect the quality metric for MSUT 10 are selected using selector 140. In one embodiment, the first set of adjustable parameters includes more than two adjustable parameters, however, this is not necessary. In one embodiment, selector 140 may provide an interface for a user to select adjustable parameters, or selector 140 may automatically select adjustable parameters, e.g., based on which adjustable parameters historically cause the most change in a quality metric for a particular MSUT 10 or process step. The adjustable parameters may include at least one tool operation adjustable parameter and at least one analysis adjustable parameter. An "operational adjustable parameter" may include any feature of MSUT 10 that can be adjusted to adjust data acquisition; and an "analysis adjustable parameter" may include any feature of MSUT 10 that can be adjusted during data analysis, e.g., an algorithm filter in a CD-SEM. In the CD-SEM example, two analysis adjustable parameters can be used: the smoothing filter width magnitude and the edge detection threshold, each of which affect the quality metrics shown, i.e., TMU, slope and offset. That is, both of these adjustable parameters affect how each signal is processed for a measurement and affect the quality metrics TMU, slope, and offset. It is understood, however, that other CD-SEM adjustable parameters could also have been used such as accelerating voltages, scanning strategies and other algorithm parameters. In another example, a scatterometry tool's adjustable parameters may include variations of models used to provide a dimensional measurement that could be used for the given manufacturing process step.

In step S4, calculator 144 calculates the quality metric over a range of values of each adjustable parameter in the first set of adjustable parameters. That is, measurements are acquired by measurer 142 while varying the adjustable parameters and the quality metric is calculated over the range of values of each adjustable parameter. Step S4 may include calculator 144 invoking measurer 142 to instruct MSUT 10 to measure artifacts 16, e.g., a set of PSAs, over the range of values of each adjustable parameter in the first set of adjustable parameters, and then calculate the quality metric for each measurement. Each artifact 16 is repeatedly measured across fleet 12 of measurement systems 10 using the same measurement recipe for each measurement system. By making repeated measurements on each measurement system 10, the data generated can be analyzed, as described below. In the CD-SEM example, a measurement recipe is created that measures numerous semi-nested lines across artifacts 16. Additionally, the measurement recipe may be run repeatedly to determine precision for the semi-nested line measurement sites on artifacts 16. With the adjustable parameters chosen in the CD-SEM exercise, it was feasible to use the same scanned images for all of the adjustable parameter variable combinations. The CD-SEM raw waveforms/images were saved from each site during the automated data collection run. In the case where adjustable parameters are analysis-adjustable parameters, calculator 144 may employ an offline analysis workstation (not shown) to apply different smoothing filters and edge detection settings to each waveform/image. The measurements for each adjustable parameter combination are reported and they can be used to compare against the AFM reference data.

In step S5, generator 146 generates a first multidimensional (MD) response space based on the calculating step (step S4). In one embodiment, each combination of adjustable parameters and quality metric value are mapped into a three-dimensional space. FIGS. 4A-C show examples of multidimensional response spaces for quality metrics offset (FIG. 4A), slope (FIG. 4B) and TMU (FIG. 4C) for the CD-SEM example, as a function of the analysis adjustable parameters of smoothing filter width magnitude (X-axes) and edge detection threshold (Y-axes). In FIGS. 4A-C, the values of the quality metrics are indicated by height. However, any now known or later developed multidimensional response space may be used. Referring to the TMU response space in FIG. 4C, each of the contours represents a different TMU value, where lower (indicated by darker shading) is better. As part of step S5, each multidimensional response space generated may be stored, e.g., in storage system 122, by storer 150 for later reference.

In step S6, determinator1 48 determines which value of each adjustable parameter optimizes the quality metric based on the first multidimensional response space. In one embodiment, the optimized value of each adjustable parameter may be easily determinable by analysis of first multidimensional response space. For example in FIG. 4B, for the slope quality metric there is only one region that is optimized (which is near 1.0) (middle on right), hence whatever values of the adjustable parameters are used at that point are determined to be the optimized values.

In other embodiments, the optimized value of each adjustable parameter may not be easily determinable. For example, for the TMU quality metric in FIG. 4C, two dark regions (foreground corner and back right corner) are shown indicating potential optimized values of the adjustable parameters. The offset and slope multidimensional response spaces in FIGS. 4A and 4B are also plotted against smoothing width magnitude and edge detection threshold. For the offset, it is desirable to be zero while TMU is minimized. In this example, one notices that the zero offset condition (optimal value) for the offset quality metric occurs near one of the minima from the TMU quality metric multidimensional response space. Additionally, on the corresponding slope quality metric multidimensional response space, a value of 1.0 is desirable. Therefore the optimal smoothing width magnitude choice ends up being around 8.0 and the optimal edge detection threshold ends up being around 10. As a result, these adjustable parameter values are then determined as the optimized values for measuring the particular manufacturing process step.

It is understood that the interaction between the user and determinator 148 also may play a role in establishing the quality metrics and the search constraints. For example, in some instances, it may be necessary for the user to limit the focus of a multidimensional space. For example, it may be difficult to determine whether an optimized value is really being observed. In this case, the multidimensional space may be re-focused on the particular data in question to aid in the determination. In another illustrative situation, it may be necessary for a user to set the different weighting factors where more than one quality metric is used. Accordingly, user interaction with determinator 148 may be advantageous in some cases.

In other situations, it may be advantageous to compare the measurement performance for a new process step in manufacturing or development with measurement performance from similar process steps whose multidimensional response space has been previously saved. In this case, this step may also include obtainer 152 obtaining a second multidimensional response space that is based on a second set of adjustable parameters, e.g., recalling it from storage system 122 or otherwise generating it. The second multidimensional response space can be used with the first multidimensional response space to determine which value of each adjustable parameter optimized the quality metric. In one embodiment, a second multidimensional response space for a different quality metric generated using a second set of adjustable parameters identical to the first set, such as those shown for offset and slope, may be used to determine the optimized values.

In another embodiment, the recalled multidimensional response space may be from similar optimization exercises to aid the decision making for selecting optimized values when the multidimensional response space data is missing for the current situation. For example, when optimizing the measurement parameters for measuring contact holes, the data may include quality metric multidimensional response space(s) as a function of threshold but no smoothing filter information. In this case, the user may elect to recall the smoothing filter multidimensional response space for this quality metric for other applications like the gate application. In another embodiment, obtaining related multidimensional response spaces is valuable where accuracy information (e.g., TMU, slope, offset) is obtained but matching information (FMP) has not been obtained. In this case, the user may elect to obtain the FMP multidimensional response space for the same parameters for the same or similar application to aid in the decision making. It is understood that the above-described embodiments illustrating situations where recall of previously stored multidimensional response spaces are non-comprehensive, and a myriad of other situations may also exist.

It is understood that the above teachings are not limited to two adjustable parameters, nor to a CD-SEM.

IV. Conclusion

It is understood that the order of the above-described steps is only illustrative. To this extent, one or more steps can be performed in parallel, in a different order, at a remote time, etc. Further, one or more of the steps may not be performed in various embodiments of the invention.

While shown and described herein as a method and system for optimizing a measurement system under test (MSUT), it is understood that the invention further provides various alternative embodiments. For example, in one embodiment, the invention provides a computer-readable medium that includes computer program code to enable a computer infrastructure to optimize a measurement system under test (MSUT). To this extent, the computer-readable medium includes program code, such as optimization system 106 (FIG. 1), which implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 112 (FIG. 1) and/or storage system 122 (FIG. 1) (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider, such as an Application Service Provider, could offer to optimize a measurement system under test (MSUT) as described above. In this case, the service provider can manage (e.g., create, maintain, support, etc.) a computer infrastructure, such as computer infrastructure 102 (FIG. 1), that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for optimizing a measurement system under test (MSUT). In this case, a computer infrastructure, such as computer infrastructure 102 (FIG. 1), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device, such as computing device 104 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of optimizing a measurement system under test (MSUT), the method comprising:
   selecting a first set of three adjustable parameters of the MSUT that affect a quality metric for the MSUT;
   calculating the quality metric over a range of values of each adjustable parameter in the first set of adjustable parameters;
   generating a first three-dimensional response space based on the calculating step;
   determining which value of each adjustable parameter optimizes the quality metric based on the first three-dimensional response space; and
   conveying each value.

2. The method of claim 1, wherein the quality metric includes at least one of the following quality metrics: a total measurement uncertainty (TMU), a tool matching precision (TMP), a fleet measurement precision (FMP), a precision, an offset, a slope, and a slope-induced shift offset (SISoffset).

3. The method of claim 1, wherein the quality metric includes a combination of a plurality of quality metrics in which at least one of the plurality of quality metrics is assigned a different weighting than the other of the plurality of quality metrics.

4. The method of claim 1, wherein the first set of three adjustable parameters includes at least one tool operation adjustable parameter and at least one analysis adjustable parameter.

5. The method of claim 1, wherein the calculating step includes:
   measuring a set of process stressed artifacts over the range of values of each adjustable parameter in the first set of three adjustable parameters; and
   calculating the quality metric for each measurement.

6. The method of claim 1, further comprising the step of storing the first three-dimensional response space.

7. The method of claim 1, wherein the determining step includes:
   obtaining a multidimensional response space that is based on a second set of adjustable parameters; and
   determining which value of each adjustable parameter in the first three-dimensional response space and the multidimensional response space optimizes the quality metric.

8. The method of claim 1, wherein the MSUT includes a fleet of tools.

9. A system for optimizing a measurement system under test (MSUT), the system comprising:

a calculator for calculating a quality metric for the MSUT over a range of values of each adjustable parameter in a first set of three adjustable parameters that affect the quality metric;

a generator for generating a first three-dimensional response space based on the calculating step; and a determinator for determining which value of each adjustable parameter optimizes the quality metric based on the first three-dimensional response space.

10. The system of claim 9, wherein the quality metric includes at least one of the following quality metrics: a total measurement uncertainty (TMU), a tool matching precision (TMP), a fleet measurement precision (FMP), a precision, an offset, a slope, and a slope-induced shift offset (SISoffset).

11. The system of claim 10, wherein the quality metric includes a combination of a plurality of quality metrics in which at least one of the plurality of quality metrics is assigned a different weighting than the other of the plurality of quality metrics.

12. The system of claim 9, wherein the first set of three adjustable parameters includes at least one tool operation adjustable parameter and at least one analysis adjustable parameter.

13. The system of claim 9, further comprising:

a measurer for measuring a set of process stressed artifacts over the range of values of each adjustable parameter in the first set of three adjustable parameters; and wherein the calculator calculates the quality metric for each measurement.

14. The system of claim 9, further comprising a storer for storing the first three-dimensional response space.

15. The system of claim 9, wherein the determinator includes:

an obtainer for obtaining a multidimensional response space that is based on a second set of adjustable parameters; and wherein the determinator determines which value of each adjustable parameter in the first three-dimensional response space and the multidimensional response space optimizes the quality metric.

16. The system of claim 9, wherein the MSUT includes a fleet of tools.

17. The system of claim 9, further comprising a selector for selecting the first set of three adjustable parameters of the MSUT.

18. A program product stored on a computer-readable medium, which when executed, optimizes a measurement system under test (MSUT), the program product comprising:

program code for calculating a quality metric for the MSUT over a range of values of each adjustable parameter in a first set of three adjustable parameters that affect the quality metric;

program code for generating a first three-dimensional response space based on the calculating step;

program code for determining which value of each adjustable parameter optimizes the quality metric based on the first three-dimensional response space; and program code for conveying each value.

19. The program product of claim 18, wherein the quality metric includes at least one of the following quality metrics: a total measurement uncertainty (TMU), tool matching precision (TMP), a fleet measurement precision (FMP), a precision, an offset, a slope and a slope-induced shift offset (SISoffset).

20. The program product of claim 18, wherein the quality metric includes a combination of a plurality of quality metrics in which at least one of the plurality of quality metrics is assigned a different weighting than the other of the plurality of quality metrics.

21. The program product of claim 18, wherein the first set of three adjustable parameters includes at least one tool operation adjustable parameter and at least one analysis adjustable parameter.

22. The program product of claim 18, further comprising:

program code for measuring a set of process stressed artifacts over the range of values of each adjustable parameter in the first set of three adjustable parameters; and wherein the calculating program code calculates the quality metric for each measurement.

23. The program product of claim 18, further comprising program code for storing the first three-dimensional response space.

24. The program product of claim 23, wherein the determining program code includes:

program code for obtaining a multidimensional response space that is based on a second set of adjustable parameters; and wherein the determining program code determines which value of each adjustable parameter in the first three-dimensional response space and the multidimensional response space optimizes the quality metric.

25. The program product of claim 18, wherein the MSUT includes a fleet of tools.

26. The program product of claim 18, further comprising program code for selecting the first set of three adjustable parameters of the MSUT.

27. A method of optimizing a measurement system under test (MSUT), the method comprising:

selecting a first set of three adjustable parameters of the MSUT that affect a quality metric for the MSUT;

measuring a set of process stressed artifacts over the range of values of each adjustable parameter in the first set of three adjustable parameters;

calculating the quality metric for each measurement;

generating a first three-dimensional response space based on the calculating step;

obtaining a second three-dimensional response space that is based on a second set of adjustable parameters;

determining which value of each adjustable parameter in the first three-dimensional response space and the second three-dimensional response space optimizes the quality metric; and conveying each value.

* * * * *